Patented Sept. 2, 1952

2,609,329

UNITED STATES PATENT OFFICE 2,609,329

PROCESS FOR PRODUCING AUREOMYCIN

Joseph G. Niedercorn, Pearl River, N. Y., assignor to American Cyanamid Company, New York, N. Y., a corporation of Maine No Drawing. Application December 15, 1948, Serial No. 65,512

10 Claims. (Cl. 195—80)

This invention relates to a process for producing an antibiotic from *Streptomyces aureofaciens* and a medium in which this antibiotic may be formed. An object of this invention is to provide a process whereby the production of and yield of the antibiotic known as aureomycin may be improved. A further object of this invention is to provide a culture medium in which this antibiotic may be more effectively produced. It is a further object to produce a fermentation medium in which tap water may be used, in which a cation is introduced which will cause the aureomycin produced to be present in an insoluble form, and in which the pH is controlled or controllable within a range in which the yields are particularly satisfactory.

Within the last few years a considerable number of metabolic products of various bacteria and fungi have been isolated and found to possess desirable therapeutic properties. Each of these antibiotics is produced under conditions that are peculiar unto itself, and surprisingly slight variations in procedures can produce remarkable increases in yield of the desired material. Such minor variations in culture media as are almost beyond the range of feasible measurement at times give such remarkable variations in the yields of the desired antibiotic as to almost make the yield seen fortuitous, and definitely are such as to render a process not taking advantage of such small variations in conditions outside the limits of the practical commercial processes. Many of these antibiotics are well known, particularly penicillin, streptomycin, etc.

The antibiotic to which this invention relates is much newer and not so well known. The technical press within the last few months has disclosed many of the remarkable properties of aureomycin. Certain papers presented at the July 1948 meeting of the New York Academy of Sciences mention the antibiotic and the microorganism producing it. These papers are written up in the Annals of the New York Academy of Sciences, volume 51, Article II, November 1948.

The product called aureomycin is produced by a fungus of the species of the genus Streptomyces, at one time designated as A-377 but which is now known in the scientific world under the name of *Streptomyces aureofaciens*.

The fungus, which might well be called an ultra mold, was first isolated from the soil of a field of timothy in Missouri. A method of isolation, and a description of the characteristics of both the mold *Streptomyces aureofaciens* and the product, which for purposes of convenience will be herein referred to as aureomycin, are described in an application Serial Number 7,592, filed February 11, 1948, by Benjamin M. Duggar, entitled Antibiotic Substance and Preparation of the Same.

Aureomycin is effective against many bacteria, including both gram-positive and gram-negative, and has shown certain remarkable characteristics in its effect upon certain viral and rickettsial diseases. The exact characteristics of the antibiotic are not here critical. They are described and the product itself is claimed in the above mentioned application of Duggar. The antibiotic as the monohydrochloride has the analysis, carbon 51.49%; hydrogen 5.44%; nitrogen 5.53%; chlorine 13.51%; ash none; oxygen 24.03% by difference. Crystals of the hydrochloride occur in tubular or equidimensional orthorhombic form. They have a clear vitreous lemon yellow color with refractive indices of alpha $1.633 \pm .005$; beta $1.705 \pm .005$ and gamma $1.730 \pm .005$. The specific rotation of the hydrochloride salt in methanol is $[\alpha]_D^{23} = -295.9$ and in water $[\alpha]_D^{23} = -227.9$.

A characteristic infrared absorption spectra of the hydrochloride salt in hydrocarbon oil shows adsorption bands near 3295, 3050, 1665, 1650, 1575, 1523, 969, 840, 851 and 863 cm.$^{-1}$.

The organism which produces this antibiotic is typically aerobic, with limited growth when submerged. A mycelium is formed and the material in general has characteristic yellow colors. Under ultra violet light, the aureomycin produced appears a bright yellow.

In the past, fermentation media have been used which have given commercially practical yields of aureomycin, but by the improved process herein set forth it is found that the yield of the product is so greatly increased and the process rendered so much more efficient than anything that had been known in the prior art as to replace them in a competitive market.

It has been found that the desired metabolic products and perhaps other products of the growth of the micro-organism appear to act as "staling" products which inhibit the further growth of not only any bacteria that may be present but of the formative micro-organism itself. It has been found that the addition of certain salts of certain metals as cations appear to cause the precipitation or sequestration of these products as formed. The cations which are suitable are certain bivalent cations, namely those of calcium, barium, strontium and magnesium. These may be added either as salts of the particular metals or as the hydroxides of the metals. It is generally desirable that a relatively large quantity of such cations be present, generally, computed on the basis of the cation itself, in the neighborhood of .1% or more. Considerably greater quantities normally do not inhibit the growth and commonly as much of the metallic cations as will remain in solution are not detrimental. It may be that the mechanism is that because the antibiotic is a sparingly soluble weak base, it is precipitated as the metallic salt and since the antibiotic as formed is thus removed from the fermentation medium, its removal allows a heavier growth of the formative micro-organism and the resultant additional antibiotic formation.

Additionally it has been found that for maximum growth, it is necessary that the pH of the fermentation medium be controlled within rather narrow limits. Highly effective growths may be obtained within the range of about 5.0 to 8.0. Best results are obtained within the range of approximately 6.4 to 7. The pH of the fermentation liquor must be stabilized because during the process of fermentation, acidic products result which will normally cause the medium to become too acid. To overcome this inherent acidification tendency, it is necessary that either an alkaline material be added at such rate that the pH is controlled or that a material which acts as an effective alkali reserve be present to such an extent that the pH is maintained within this range.

The fermentation, to produce a therapeutically desirable product, should be conducted under sterile conditions such that the desired microorganism is the only one present during the growth, as any fermentation medium which is satisfactory to the desired growth may also be satisfactory for undesired growths if it becomes inoculated with such undesired micro-organisms. The control of pH aseptically is an extremely difficult procedure so that while this invention may be practiced by maintaining pH control, as for example, by sterilely removing portions of the fermentation medium and measuring its pH, then aseptically adding sufficient alkaline material to keep the pH as desired, such procedure introduces complications from the standpoint of operation. Fortuitous variations in the materials used and in various conditions in the particular batches are such that it is extremely difficult to work out a cycle of addition to maintain the pH without repeated measuring of the pH.

As a particularly advantageous phase of this invention is the control of the pH by the introduction of a material which from its inherent characteristics will hold the pH within a desired range. For this purpose, it has been found that calcium carbonate is particularly desirable, and magnesium phosphate gives very satisfactory results. These products simultaneously introduce both the metallic cations desired and the alkali reserve. Calcium carbonate, as the cheapest and most readily available, may be used in the form of precipitated chalk. Calcium carbonate is soluble to the extent of about 0.0015 gm. per 100 ml. in pure water and is somewhat more soluble in the fermentation medium herein used. Calcium carbonate is particularly effective within the range of 0.25% to 1.0% by weight in the medium. Extremely high yields are obtained when approximately 0.625% is present. Larger quantities than 1% are unnecessary and may cause difficulties during the recovery of the aureomycin. Less than .25% calcium carbonate is not sufficient alone to maintain the desired pH control for maximum yield. If less than this amount of calcium carbonate is used, the fermentation medium must either be controlled as to pH by other means or the medium will become so acid as to inhibit the production of aureomycin before the yield has been reached that would otherwise be the maximum. The calcium carbonate apparently neutralizes any acid produced during the fermentation and the carbonate portion is eliminated as carbon dioxide or remains present in the form of bicarbonate ion, but regardless of theory, does control the pH to the range which has been found to be most advantageous.

Magnesium phosphate is another material which contains sufficient inherent alkali reserve to give the combined effect of maintaining the pH within the desired range while giving the additional combined desirable effect of removing growth inhibiting products from the solution.

During the fermentation, for the sustenance of the micro-organism, it is necessary that there be present a source of nitrogen. This may be present as an inorganic salt such as ammonium sulfate. Other sources of available nitrogen for the fermentation are such materials as corn steep liquor, casein or casein hydrolysate, meat extracts, peptone, fish solubles, tankage, etc., and combinations of one or more of such sources. As a source of energy there must be a carbohydrate present such as sucrose, dextrose, starch or dextrine, or a combination of them. With sucrose as the source of carbohydrate, ammonium sulfate is particularly advantageous as a source of at least part of the nitrogen.

The fermentation may take place either on the surface of the quiescent fluid, in shaker flasks, or in deep tanks aided by agitation and aeration, or both. For large scale commercial production, the use of deep tanks with aeration and constant agitation gives a more rapid, more efficient, and more economical method of production than is obtained by the other means.

The fermentation broth must have present in it traces of certain elements for effective growth of the micro-organism. For this purpose it is desirable that there be present from impurities and as added salts at least approximately amounts of salts equal to 0.00033% manganese as $MnCl_2.4H_2O$; 0.00033% copper as $CuSO_4.5H_2O$; and 0.005% zinc as $ZnSO_4.7H_2O$. Under many fermentation conditions it will be found that sufficient of these trace elements are present as impurities or are present in such nutrient fractions as the corn steep liquor or casein, etc. so that additional quantities of the salts need not be added.

The quantities of the various nutrient materials may be varied widely and still yield a practical quantity of aureomycin. For preferred results, corn steep liquor may serve as a partial source of the available nitrogen, as a source of certain of the trace elements, and as a source of some of the carbohydrate. A convenient form of supplying the corn steep liquor is as penicillin grade corn steep liquor containing approximately 50% solids. Of such a grade for optimum results approximately 2% of the liquor containing 50% solids is used. Up to 3% may be employed economically but more than 3% gives a less desirable operating condition. It is not necessary that corn steep liquor be used but at least 1% is reasonably cheap and furnishes an effective source of nutrients.

Sucrose is a cheap and readily available source of carbohydrate. For maximum production a recommended percentage is 3% by weight. Up to 5% may be effectively used, and other materials may be substituted entirely for the sucrose as a source of carbohydrate.

As an inoculum may be used a slant or other source of culture but the most economical production is obtained when sufficient inoculum is used to be between approximately 1 and 5% by volume of the main fermentation tank. A convenient method of operation is using the same types of nutrient media and to start with an agar slant of the micro-organisms and seed shaker flasks with the *Streptomyces aureofaciens* from the agar slant.

The strains of *Streptomyces aureofaciens* will vary. The exact growing conditions, regarding both time and the most desirable culture medium, pH, the temperature, the yield, the trace element, etc. will be slightly different for each and may be considerably different depending upon the exact strain being used. The proportions given herein are for certain strains which have been found to be highly satisfactory. The results disclosed are those which are preferable for the particular strain used and it is within the skill of the art that once the compositions have been pointed out as in this specification, minor modifications may be made to take care of such variations in the strain.

To reduce the effect of variations in the strain and to insure that each successive tank in commercial production is started off under conditions as nearly similar as possible, and to insure against contamination, it is customary to start each tank with its own culture. It is to be understood that a portion of each tank can be reserved as a culture for the next tank, as for example 5 or 10% more or less may be saved from each tank and used as the inoculum for the next tank, but such a procedure is likely to allow a contamination to ruin several tanks before the culture is replaced. When each tank is started from its individual slant, each individual tank is much more likely to give similar results and furthermore each individual tank is operating independently of the others so that one wild batch will not ruin additional tanks. A satisfactory method of this is to use an agar slant which is inoculated from a Petri dish or from other agar slants and permit the *Streptomyces aureofaciens* to grow on the surface of the agar slant. The culture growing thereon may be inspected under a microscope to determine that it is completely satisfactory and appears to be normal. The slant may then be used to inoculate from 2 to 6 shaker flasks each containing about 100 cc. of a medium in a 500 cc. flask. The fermentation medium may be the same as disclosed for the main tanks. After fermentation in the shaker flask for a sufficient period to become fairly mature, the flasks may then be used to seed aerated bottles which contain 1 to 5% by volume of the volume of the final fermentation tank and which bottles are seeded to the extent of 1 to 5% by volume from the shaker flasks. These aerated bottles may then be used as the seed for the main tank. By thus utilizing a pre-formed inoculum produced in such aerated bottles and shaker flasks, there is greater certainty that the main fermentation tank will be inoculated with such a concentration of such a pure strain that consistently high yields may be more easily thereby obtained.

It is generally preferable that 1 to 5% of the pre-formed inoculum be used as less than this will require an unduly prolonged fermentation cycle and more than this will require an uneconomically large quantity of inoculum. The variations are of course wide and readily predictable. The rates of growth and fermentation times herein given are for inoculations within these limits. From the well known laws governing organic growth there may be predicted the necessary changes in fermentation time to permit different quantities of pre-formed inoculum to be used in the final fermentation tank. The rate of formation of the desired product is not a simple function of time, and more, relatively, of the desired product appears to be produced by the more mature culture.

A time of approximately 36 hours has been found most desirable in many instances. From 24 to 60 give very satisfactory results with the 1 to 5% pre-formed inoculum as seed. If the tank is permitted to set too long, the yields may drop. Modifications within reasonable limits as to times, temperatures and quantities will readily present themselves to those skilled in the art.

For the purpose of illustrating the invention, certain specific examples are set forth here below. It is to be understood that these specific examples are to illustrate only certain embodiments of the general invention and that marked variations may occur from the preferred examples and still give satisfactory results.

EXAMPLE 1

For purposes of convenience a media containing tap water was used. An inocula was prepared with spores from a potato tube slant and was used to inoculate 8 shakers of seed media. The seed media contained

| | Per cent |
|---|---|
| Corn steep liquid | 2 |
| Sucrose | 3 |
| $CaCO_3$ | 0.5 |

After 24 hours of incubation at 28° C. during which the seed medium was constantly shaken, 4 flasks were combined to form 2 inocula. From these inocula, identical tanks were seeded so that the results obtained would be an average of several tanks and of several inocula so that any errors in technique, judgement or assay would show in the final result and thereby serve as a check upon procedures and eliminate the effect of fortuitous occurrences. A final fermentation tank was prepared containing tap water as a diluent,

| | Per cent |
|---|---|
| Corn steep liquor, penicillin grade, 50% solids | 2 |
| Sucrose | 3 |
| $CaCO_3$ | 0.625 |
| Ammonium sulfate | 0.2 |

Sufficient quantities of the salts of manganese, copper and zinc were added to insure that these trace elements were present to the extent indicated in the preceding discussion. The tank was adjusted to a pH of 6.0 with 1 normal potassium hydroxide, and sterilized. During sterilization, the pH rose to approximately 7.2 to 7.4; and dropped to the range of 6.3 to 6.6 during the period of growth. The tank was inoculated with the pre-formed inocula as above described, using 5% by volume of the pre-formed inocula and was permitted to grow for 36 hours at 28° C. with constant agitation and aeration. In addition to its other effects, this agitation keeps the calcium carbonate suspended. It may be noted that a large quantity of the antibiotic was removed from the medium during the fermentation because of the calcium carbonate present. A portion of the final mash was brought to a pH of approximately 3 with sulfuric acid, filtered, and assayed. The assay of the tank showed it to contain 396 micrograms of aureomycin per ml.

EXAMPLES 2 TO 27

Similar runs were made under conditions the same but on a smaller scale as those for the preceding example to determine the effect of various variables on the production of aureomycin. Except as indicated all conditions were substantially the same as those of the preceding example. The percent of sucrose, the percent of calcium carbonate and the time were varied in conjunction with each other to determine the effect of each of these variables. The time and concentrations are those shown in the table.

*Table I*

[Yield in micrograms per milliliter of mash.]

| CaCO$_3$ percent | 24 hr. Incubation Percent Sucrose | | | 36 hr. Incubation Percent Sucrose | | | 48 hr. Incubation Percent Sucrose | | |
|---|---|---|---|---|---|---|---|---|---|
| | 3.0 | 4.0 | 5.0 | 3.0 | 4.0 | 5.0 | 3.0 | 4.0 | 5.0 |
| 0.25 | 142 | 125 | 116 | 230 | 200 | 199 | 186 | 228 | 213 |
| 0.625 | 140 | 167 | 180 | | 235 | 280 | 264 | 247 | 249 |
| 1.0 | 160 | 162 | 149 | 204 | 272 | 279 | 278 | 288 | 220 |

From the above results it will be seen that the results of Example 1 show a preferred operating condition for obtaining maximum yields with the particular strain herein utilized.

EXAMPLE 28

A fermentation medium was prepared using tap water and

|   | Per cent |
|---|---|
| Casein | 1.0 |
| Sucrose | 3.0 |
| MgSO$_4$.7H$_2$O | 0.02 |
| FeSO$_4$.7H$_2$O | 0.001 |
| CuSO$_4$.5H$_2$O | 0.00033 |
| MnCl$_2$.4H$_2$O | 0.00033 |
| ZnSO$_4$.7H$_2$O | 0.005 |
| CaCO$_3$ | 0.5 |
| K$_2$SO$_4$ | 0.6 |
| NH$_4$OH | 0.35 |

100 ml. of the medium was introduced into a 500 ml. flask, sterilized, and seeded with 5 ml. of an inoculum prepared as in Example 1. The material was shaken constantly to provide both aeration and agitation under aseptic conditions for a period of 40 hours. At the end of this period, the sample of mash was brought to a pH of 3 with sulfuric acid, filtered and assayed. The assay showed the mesh to contain 274 micrograms of aureomycin per ml.

EXAMPLE 29

A fermentation medium was prepared containing

|   | Per cent |
|---|---|
| Casein | 1.0 |
| Sucrose | 3.0 |
| Ammonia | 0.18 |
| (NH$_4$)$_2$SO$_4$ | 0.166 |
| FeSO$_4$.7H$_2$O | 0.001 |
| MnCl$_2$.4H$_2$O | 0.00033 |
| CuSO$_4$.5H$_2$O | 0.00033 |
| ZnSO$_4$.7H$_2$O | 0.005 |
| KCl | 0.05 |
| MgSO$_4$.7H$_2$O | 0.05 |
| CaCO$_3$ | 0.25 |
| Calcium hydroxyisobutyrate | 0.14 |

The flasks were prepared as in the preceding experiment containing this fermentation medium and after sterilization the flask was inoculated with 5 ml. of the pre-formed inoculum as set forth in Example 1. The initial pH was 8 and after 40 hours the pH was 6.8. After 40 hours at 28° C. the medium was brought to a pH of 3 with sulfuric acid, filtered and assayed. The assay showed the flask to contain 269 micrograms of aureomycin per ml.

EXAMPLE 30

A fermentation medium was prepared and fermented under conditions identical with that of the preceding example except that instead of the calcium hydroxyisobutyrate the medium contained 0.0004% of CoCl$_2$.6H$_2$O. The initial pH was 7.7. The final pH was 7.1; and the mash was found to assay 245 micrograms per ml.

EXAMPLE 31

A fermentation medium was prepared containing

|   | Per cent |
|---|---|
| Corn steep liquor | 2 |
| Sucrose | 3 |
| Ammonium sulfate | 0.2 |
| Mg$_3$(PO$_4$)$_2$.7H$_2$O | 1.54 |

100 ml. of the medium was introduced into a 500 ml. flask, sterilized, and seeded with 5 ml. of an inoculum as in Example 1. The material was shaken constantly to provide both agitation and aeration under aseptic conditions for a period of 40 hours. The initial pH was 6.2, and the final pH 5.8. At the end of this period an analysis showed 217 micrograms of aureomycin per ml.

EXAMPLE 32

A fermentation medium was prepared and allowed to grow as in the preceding experiment containing 0.925% strontium carbonate, instead of the magnesium phosphate, for 40 hours at 28° C. as set forth in the preceding example. All other conditions were the same as in the preceding example; and upon analysis the mash was found to contain 209 micrograms of aureomycin per ml. The initial pH was 6.4; the final 5.8.

EXAMPLE 33

A fermentation medium was prepared as in Example 31, containing 1.25% of barium carbonate instead of the magnesium phosphate. The initial pH was 7.3; the final 7.1. Upon completion of the fermentation the mash was found to contain 192 micrograms of aureomycin per ml.

EXAMPLE 34

A fermentation medium was prepared containing

|   | Per cent |
|---|---|
| Corn step liquor | 2 |
| Sucrose | 3 |
| Ammonium sulfate | 0.4 |
| Calcium carbonate | 0.2 |

The material was neutralized to a pH of 6.5 with potassium hydroxide, inoculated with the inoculum prepared in accordance with the instructions of Example 1 and harvested after 40 hours at 28° C. The material was found to contain 228 micrograms of aureomycin per ml.

EXAMPLE 35

A fermentation medium was prepared containing

|  | Per cent |
| --- | --- |
| Corn steep liquor | 3 |
| Sucrose | 5 |
| Calcium carbonate | 0.8 |
| Ammonium sulfate | 0.1 |

A 500 ml. flask containing 100 ml. of the solution was sterilized, inoculated with 5 ml. of the inoculum prepared in accordance with the instructions of Example 1 and permitted to ferment for a period of 40 hours at a temperature of 28° C. Upon assay the material was found to contain 190 micrograms of aureomycin per ml.

EXAMPLE 36

A fermentation medium was prepared using tap water and containing

|  | Per cent |
| --- | --- |
| Corn steep liquor | 1 |
| Sucrose | 3.2 |
| Ammonium sulfate | 0.2 |
| Calcium carbonate | 0.7 |

No minerals were added. After sterilization, the medium was fermented at 28° C. for a period of 40 hours, having been inoculated with 5 ml. of an inoculum prepared as in Example 1. The initial pH of the fermentation was 8.0, and the final pH was 6.6. A yield of 221 micrograms of aureomycin per ml. was obtained.

EXAMPLE 37

A fermentation medium was prepared in accordance with the procedure of Example 36 with the exception that but ½% of corn steep liquor was used. A yield of 144 micrograms per ml. was obtained. The initial pH was 8.1, and the final 7.1. The lower yield was due to the lack of sufficient nutrient material in the media. If more corn steep liquor or if other material such as casein, tankage, meat extracts, peptone or fish solubles, etc. had been added as a source of available nitrogen, the yield would have been higher and accordingly more commercially satisfactory.

EXAMPLE 38

A fermentation medium was prepared containing

|  | Per cent |
| --- | --- |
| Casein | 1 |
| Ammonium sulfate | 0.2 |
| Calcium alpha-hydroxyisobutyrate | 0.12 |
| Calcium carbonate | 0.5 |
| $FeSO_4.7H_2O$ | 0.001 |
| $CuSO_4.5H_2O$ | 0.00033 |
| $MnCl_2.4H_2O$ | 0.00033 |
| $ZnSO_4.7H_2O$ | 0.005 |
| $MgSO_4.7H_2O$ | 0.05 |
| Carbohydrate | 3.0 |

In this base mixture, as a source of carbohydrate, 3% of dextrose was used. The medium was sterilized, and seeded with 5 ml. of an inoculum prepared as in Example 1. The material was shaken constantly to provide both agitation and aeration under aseptic conditions for a period of 40 hours at 28° C. The initial pH was 7.8, and the final 6.5. Upon analysis the mash was found to contain 181 micrograms of aureomycin per ml.

EXAMPLE 39

A fermentation medium was prepared and fermented in accordance with the procedure set forth in Example 38 except that 3% dextrine was used as the source of carbohydrate, the final pH was 7.0, and there was obtained a yield of 141 micrograms per ml. of aureomycin.

EXAMPLE 40

A fermentation medium was prepared and fermented in accordance with the procedure set forth in Example 38 except that maltose was used as the source of carbohydrate, the final pH was 7.6, and thereby was obtained a yield of 109 micrograms of aureomycin per ml.

EXAMPLE 41

A fermentation medium was prepared and fermented in accordance with the procedure set forth in Example 38 except that sucrose was used as the source of carbohydrate, the final pH was 6.8, and thereby was obtained a yield of 219 micrograms of aureomycin per ml.

EXAMPLE 42

A fermentation medium was prepared containing

|  | Per cent |
| --- | --- |
| Corn steep liquor | 2 |
| Ammonium sulfate | 0.2 |
| Calcium carbonate | 0.5 |
| $FeSO_4.7H_2O$ | 0.001 |
| $CuSO_4.5H_2O$ | 0.00033 |
| $MnCl_2.4H_2O$ | 0.00033 |
| $ZnSO_4.7H_2O$ | 0.005 |
| $MgSO_4.7H_2O$ | 0.05 |
| Carbohydrate | 3 |

100 ml. of the medium was introduced into a 500 ml. flask, sterilized, and seeded with 5 ml. of an inoculum prepared as in Example 1. The initial pH was 6.8. The material was fermented with agitation and aeration under aseptic conditions for 40 hours at 28° C., and at the end of this period the mash was analyzed.

When the carbohydrate used was dextrine, a final pH of 6.4 and a yield of 132 micrograms per ml. was obtained.

EXAMPLE 43

A fermentation medium was prepared in accordance with the procedure set forth in Example 42 except that the carbohydrate was maltose, the final pH 7.3, and the mash yielded 130 micrograms of aureomycin per ml.

EXAMPLE 44

A fermentation medium was prepared in accordance with the procedure set forth in Example 42 except that the carbohydrate was sucrose, the final pH 6.2, and the mash yielded 225 micrograms of aureomycin per ml.

It is to be noted that the particular strain of *Streptomyces aureofaciens* will cause some variation in yield, and the strains do not necessarily remain true; but may vary through inherent changes with time. Similarly various strains will work best with slightly different media; but the above described results are indicative of what may be expected, and it is within the skill of the arts to make minor variations in the media and the fermentation conditions as suggested by the conditions above set forth to provide each strain with the particular conditions under which it will be found to thrive most satisfactorily.

Having set forth and described in detail certain aspects thereof in accordance with the laws on the subject, as my invention I claim:

1. A process for the production of aureomycin comprising preparing a medium comprising approximately sucrose 3 to 5%, ammonium sulfate 0.1 to 0.4%, corn steep liquor 1 to 3% and calcium carbonate 0.25 to 1%, said calcium carbonate providing calcium ions in an aureomycin-precipitating quantity, sterilizing the medium, inoculating the medium with a culture of Streptomyces aureofaciens, and permitting the growth of the Streptomyces aureofaciens until a commercially useful quantity of aureomycin is thereby produced.

2. A process for the production of aureomycin comprising preparing a medium comprising approximately sucrose 3%, ammonium sulfate 0.2%, corn steep liquor 2% and calcium carbonate 0.63%, said calcium carbonate providing calcium ions in an aureomycin-precipitating quantity, sterilizing the medium, inoculating the medium with a culture of Streptomyces aureofaciens, and permitting the growth of the Streptomyces aureofaciens until a commercially useful quantity of aureomycin is thereby produced.

3. A process for the production of aureomycin comprising growing a culture of Streptomyces aureofaciens in a medium comprising sucrose 3 to 5%, ammonium sulfate .1 to .4%, corn steep liquor (50% solids) 1 to 3% and calcium carbonate 0.25 to 1%, said calcium carbonate providing calcium ions in an aureomycin-precipitating quantity.

4. A process for the production of aureomycin comprising the growing of a culture of Streptomyces aureofaciens in a medium comprising approximately calcium carbonate 0.63%, said calcium carbonate providing calcium ions in an aureomycin-precipitating quantity, sucrose 3.0%, ammonium sulfate 0.2% and corn steep liquor 2% for approximately 48 hours.

5. A process for the production of aureomycin comprising the growing of a culture of Streptomyces aureofaciens in a medium comprising 0.25 to 1% calcium carbonate, said calcium carbonate providing calcium ions in an aureomycin-precipitating quantity, 3 to 5% sucrose, and 0.1 to 0.4% ammonium sulfate in submerged aerobic cultivation for a period of 24 to 72 hours to form aureomycin in the culture broth and recovering the aureomycin.

6. A process for the production of aureomycin which comprises growing a culture of Streptomyces aureofaciens in a medium comprising a source of carbohydrate, a source of nitrogen, and at least 0.25% of calcium carbonate for a sufficient period of time to produce a commercially useful quantity of aureomycin, said calcium carbonate providing calcium ions in an aureomycin-precipitating quantity.

7. A process for the production of aureomycin which comprises growing a culture of Streptomyces aureofaciens in a medium comprising a source of carbohydrate, a source of nitrogen, and at least 0.25% of magnesium phosphate for a sufficient period of time to produce a commercially useful quantity of aureomycin, said magnesium phosphate providing magnesium ions in an aureomycin-precipitating quantity.

8. A process for the production of aureomycin which comprises growing a culture of Streptomyces aureofaciens in a medium comprising a source of carbohydrate, a source of nitrogen, and at least 0.25% of calcium carbonate, said calcium carbonate providing calcium ions in an aureomycin-precipitating quantity, for a period of the order of from 24 to 72 hours in submerged aerobic cultivation, to form aureomycin in the culture broth.

9. A process for the production of aureomycin which comprises growing a culture of Streptomyces aureofaciens in a medium having available a source of carbohydrate, a source of nitrogen and at least 0.1% of cations from the group consisting of calcium, barium, strontium and magnesium, said cations being present in an aureomycin-precipitating quantity, at a pH of from 8 to 5.0 for a period of from 24 to 72 hours.

10. A process for the production of aureomycin which comprises growing a culture of Streptomyces aureofaciens in a medium having available a source of carbohydrate, a source of nitrogen and at least 0.1% of cations from the group consisting of calcium, barium, strontium and magnesium, said cations being present in an aureomycin-precipitating quantity, at a pH of from 8 to 5.0, in the presence of an alkali reserve whereby the pH is maintained within this range during the fermentation without the addition of other alkalis, for a period sufficient to produce an economic yield of aureomycin.

JOSEPH G. NIEDERCORN.

REFERENCES CITED

The following references are of record in the file of this patent:

UNITED STATES PATENTS

| Number | Name | Date |
| --- | --- | --- |
| 1,849,053 | Bernhauer | Mar. 15, 1932 |
| 2,422,230 | Foster | June 17, 1947 |
| 2,424,832 | Koerber | July 29, 1947 |
| 2,445,128 | Tanner et al. | July 13, 1948 |
| 2,448,790 | Foster | Sept. 7, 1948 |
| 2,482,055 | Duggar | Sept. 13, 1949 |
| 2,504,067 | Colingsworth | Apr. 11, 1950 |

OTHER REFERENCES

Waksman, Microbial Antagonism and Antibiotic Substances, 2nd ed., 1947, The Commonwealth Fund, 41 E. 57th St., N. Y. 22, N. Y., pages 64–65.

Annals of the N. Y. Acad. Sci., vol. 51, art. 2, November 30, 1948, pages 179, 181.

Bacteriological Reviews, 12, 4, December 1948, pages 297 to 311.